Patented Mar. 4, 1941

2,234,031

UNITED STATES PATENT OFFICE 2,234,031

WATER-SOLUBLE DYESTUFFS

Heinrich Wenning and Hans Krzikalla, Ludwigshafen-on-the-Rhine, Germany, assignors to General Aniline & Film Corporation, a corporation of Delaware No Drawing. Application August 24, 1939, Serial No. 291,701. In Germany August 30, 1938

9 Claims. (Cl. 260—204)

The present invention relates to water-soluble dyestuffs and a process of producing same.

We have found that water-soluble dyestuffs are obtained by converting organic dyestuffs which are difficultly soluble or insoluble in water and which contain at least one alcoholic aliphatically combined hydroxyl group into the ester salts of dithiocarbonic acid with alkalihydroxides and carbon disulphide.

The reaction is preferably carried out by dissolving or suspending the dyestuff in alcohol, converting it into the alkali salt with a slight excess of alkali hydroxide or alkali alcoholate, evaporating the alcohol and reacting the dry alkali salt of the dyestuff with carbon disulphide.

The dyestuff may also be directly dissolved or suspended in carbon disulphide and the solution or suspension treated with alkali hydroxide.

Generally speaking the reaction proceeds at ordinary or moderately elevated temperature; in many cases it is even preferable to cool to a moderate extent, i. e. to from about 0° to 10° C.

As initial materials for the reaction there may be mentioned members of a great variety of dyestuff classes, as for example azo dyestuffs, anthraquinone dyestuffs, carbenium and azenium dyestuffs and their leuco compounds. The aliphatically combined alcoholic hydroxyl groups may be contained in these dyestuffs in the form of, for example, a hydroxymethyl, hydroxyethyl, dihydroxypropyl or hydroxyalkyl ether group. These groups may be attached to an aromatic nucleus of the dyestuff molecule either directly or by means of a bridge, as for example an oxygen or sulphur atom or an —NH—, —NR—, —CO—, —SO$_2$—, —OCO—, —NHCO— or —NHSO$_2$— bridge.

The water-soluble dyestuffs thus prepared may serve for dyeing a great variety of materials, in particular for dyeing and printing animal fibres, such as wool, leather or silk, or vegetable fibres, such as cotton, linen, viscose or copper-ammonium artificial silk or staple fibre, and also for dyeing and printing cellulose esters and ethers, as well as mixtures of the above-mentioned kinds of fibres.

Generally speaking the character of the dyestuff is not considerably changed by the introduction of the dithiocarbonic acid group, only the solubility being increased. From water-insoluble acetate artificial silk dyestuffs, as for example hydroxyalkylaminoanthraquinones or azo dyestuffs containing hydroxyethyl groups, which do not contain sulphonic acid groups, water-soluble dyestuffs may be obtained with which acetate artificial silk may be dyed from an aqueous bath.

The new water-soluble dyestuffs are very stable to alkali hydroxides, but they split up again into the initial dyestuffs by treatment with aqueous acids, as for example acetic acid. This property may be used with advantage for the preparation of dyeings and prints fast to washing by after-treating with dilute acid materials dyed or printed with the new dyestuffs. The new dyestuffs are especially suitable for the spin-dyeing of viscose because with the precipitation of the viscose artificial silk threads in an acid bath, the added water-soluble dyestuff is precipitated at the same time within the threads as an insoluble dyestuff.

The following examples will further illustrate how this invention may be carried out in practice but the invention is not restricted to these examples. The parts are by weight.

Example 1

33 parts of 1.4-dihydroxyethylaminoanthraquinone are dissolved at from 60° to 70° C. in 150 parts of ethanol, to the solution there are added 11.4 parts of solid, finely pulverized potassium hydroxide, the whole is heated to 70° C. for about 15 minutes and the alcohol is then completely evaporated off. The residue is treated with from 100 to 120 parts of carbon disulphide at from 30° to 40° C., the excess of carbon disulphide being distilled off when the reaction is completed. A blue dyestuff powder is obtained which is extraordinarily soluble in water and dyes acetate artificial silk powerful blue shades from a neutral aqueous bath. Instead of potassium hydroxide potassium- or sodium-alcoholate may be used.

In a similar way 1.4-dihydroxypropylaminoanthraquinone, 1 - hydroxyethylamino - 4 - hydroxypropylaminoanthraquinone, 1-methylamino-4-hydroxyethylamino anthraquinone, 1.4-dihydroxyethylamino - 5.8 - dihydroxyanthraquinone, 1-hydroxyethylaminoanthraquinone and 1.5-dihydroxyethylaminoanthraquinone may also be converted into water-soluble acetate artificial silk dyestuffs.

Example 2

18 parts of the dyestuff obtained by coupling diazotized 2-amino-6-methoxybenzthiazole with dihydroxyethylaniline are dissolved in 150 parts of ethyl alcohol, 5.7 parts of potassium hydroxide are added, the solution is heated to 70° C. for about 20 minutes and the alcohol is then evaporated off under reduced pressure. The dust-dry residue is then treated with 150 parts of carbon disulphide and the excess of solvent is evaporated off.

In this way there is obtained a dyestuff which is readily soluble in water and which dyes acetate artificial silk red shades from an aqueous bath.

Example 3

23 parts of the dyestuff obtained by coupling diazotized ortho-aminophenyl-beta.gamma-dihydroxypropyl ether with 2-hydroxy-3-naphthoic acid ortho-toluidide are dissolved in 100 parts of butanol while stirring. The solution is heated to 80° C., 5.6 parts of potassium hydroxide are added and the whole stirred for about 15 minutes at 80° C. The butanol is then evaporated off under reduced pressure and carbon disulphide is added to the remaining residue. The red dyestuff obtained after evaporating off the excess of carbon disulphide is readily soluble in water. The unchanged initial dyestuff can be recovered again from the aqueous solution by addition of acid.

By using the dyestuff prepared from ortho-aminophenyl-beta.gamma-dihydroxypropyl ether and 2-hydroxynaphthalene-3-carboxylic acid phenylamide or 1-phenyl-3-methyl-5-pyrazolone instead of the abovementioned azo dyestuff, a red or yellow water-soluble dyestuff is obtained.

*Example 4*

30 parts of the yellow water-insoluble dyestuff obtained from 1-chlor-2.4-dinitrobenzene and 4-beta-hydroxyethyl-aniline are dissolved in 150 parts of anhydrous ethanol at from 60 to 70° C. and 11.5 parts of finely pulverized potassium hydroxide are added. The whole is then heated to about 70° C. for 15 minutes, the ethanol distilled off and the remaining residue is heated with about 100 parts of carbon disulphide at about 40° C. for about 2 hours while stirring. After evaporating off the excess of carbon disulphide, there remains a yellow dyestuff in form of a powder which easily dissolves in water giving a yellow coloration. From the neutral aqueous solution of the dyestuff silk is dyed in yellow shades.

The same dyestuff is obtained when the water-insoluble dyestuff is suspended in carbon disulphide and the suspension is treated with an alkali hydroxide.

What we claim is:

1. A process of producing water-soluble organic dyestuffs which comprises reacting organic dyestuffs selected from the group consisting of dyestuffs of the anthraquinone series, azo series, and diphenylamine series being from insoluble to difficultly soluble in water and having at least one alcoholic aliphatically combined hydroxyl group with carbon disulphide and alkalihydroxides.

2. A process of producing water-soluble organic dyestuffs which comprises reacting organic dyestuffs selected from the group consisting of dyestuffs of the anthraquinone series, azo series, and diphenylamine series being from insoluble to difficultly soluble in water and having at least one alcoholic aliphatically combined hydroxyl group with carbon disulphide and potassium hydroxide.

3. A process of producing water-soluble organic dyestuffs which comprises reacting organic dyestuffs selected from the group consisting of dyestuffs of the anthraquinone series, azo series, and diphenylamine series being from insoluble to difficultly soluble in water and having at least one alcoholic aliphatically combined hydroxyl group with an alkalihydroxide and subsequently carbon disulphide.

4. A process of producing water-soluble organic dyestuffs which comprises reacting organic dyestuffs selected from the group consisting of dyestuffs of the anthraquinone series, azo series, and diphenylamine series being from insoluble to difficultly soluble in water and having at least one alcoholic aliphatically combined hydroxyl group with potassium hydroxide and subsequently with carbon disulphide.

5. A water-soluble organic dyestuff corresponding to the general formula

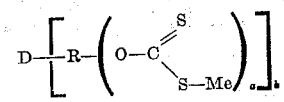

wherein D stands for the radical of an organic dyestuff selected from the group consisting of dyestuffs of the anthraquinone series, azo series, and diphenylamine series, R for a divalent aliphatic radical, Me for an alkali metal and $a$ and $b$ for integers up to two.

6. A water-soluble organic dyestuff corresponding to the general formula

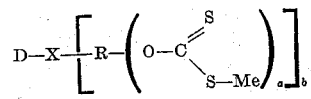

wherein D stands for the radical of an organic dyestuff selected from the group consisting of dyestuffs of the anthraquinone series, azo series, and diphenyamine series, X for a member of the class consisting of

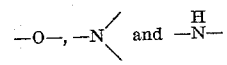

R for a divalent aliphatic radical having from 2 to 3 carbon atoms and $a$ and $b$ for integers up to two.

7. The dyestuff of the formula

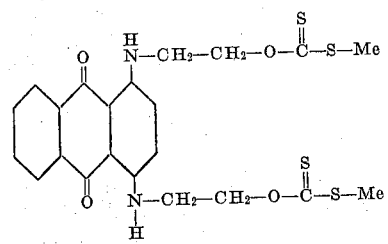

wherein Me stands for an alkali metal, which dyestuff is soluble in water and dyes acetate artificial silk powerful blue shades from a neutral aqueous bath.

8. The dyestuff of the formula

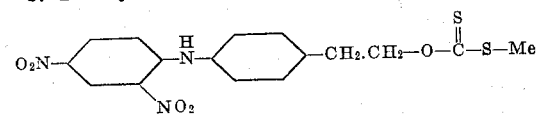

wherein Me stands for an alkali metal, which dyestuff is soluble in water and dyes animal fibres yellow shades from a neutral aqueous bath.

9. The dyestuff of the formula

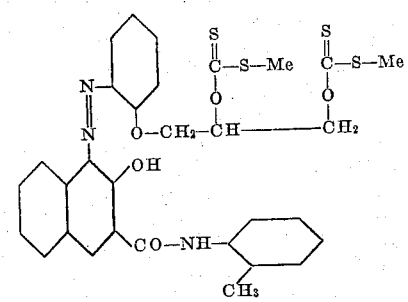

wherein Me stands for an alkali metal, which dyestuff is soluble in water and dyes animal fibres red shades from a neutral aqueous bath.

HEINRICH WENNING.
HANS KRZIKALLA.